United States Patent Office 2,906,757
Patented Sept. 29, 1959

2,906,757

SUBSTITUTED BENZODIOXANES AND THEIR PREPARATION

Jack Mills, Glenns Valley, Ind., assignor to Eli Lilly and Company, Indianapolis, Ind., a corporation of Indiana No Drawing. Application February 14, 1958
Serial No. 715,176

6 Claims. (Cl. 260—340.3)

This invention relates to novel substituted aminomethylbenzodioxanes.

By this invention there are provided novel 5-chloro-8-oxy-substituted aminomethylbenzodioxanes represented by the following formula:

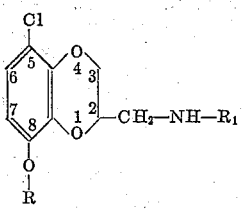

wherein R is an aliphatic hydrocarbon radical having from 1 to 3 carbon atoms, and $R_1$ is an alkyl, an alkenyl, a hydroxyalkyl, or an alkoxyalkyl radical having from 2 to 6 carbon atoms.

When R in the above formula is a lower aliphatic group it can be, for example, an ethyl, a propyl, a propargyl, or an allyl radical. Illustrative examples of $R_1$ in the above formula include the ethyl, propyl, butyl, isobutyl, sec-amyl, allyl, ethoxyethyl, hydroxyethyl, methoxypyropyl, hydroxypropyl, isopropoxypropyl, n-amyl, and n-butyl radicals.

Representative 5-halo-8-oxy-substituted aminomethylbenzodioxanes falling within the scope of the above formula include 2-ethylaminomethyl-5-chloro-8-isopropoxybenzodioxane, 2-isoamylaminomethyl-5-chloro-8-ethoxybenzodioxane, 2 - isobutenylaminomethyl-5-chloro-8-methoxybenzodioxane, 2-n-butylaminomethyl-5-chloro-8-methoxybenzodioxane, 2-sec-butylaminomethyl-5-chloro-8-allyloxybenzodioxane, 2-isopropylaminomethyl-5-chloro-8-n-propoxybenzodioxane, and 2-n-ethylaminomethyl-5-chloro-8-propargyloxybenzodioxane.

Included within this invention are the pharmaceutically acceptable acid addition salts of the substituted aminobenzodioxanes. Both organic and inorganic acids can be employed to form pharmaceutically acceptable salts with the various aminobenzodioxane bases, illustrative acids being hydrochloric acid, hydrobromic acid, sulfuric acid, phosphoric acid, maleic acid, acetic acid, benzoic acid, succinic acid, citric acid, and the like.

The aminomethylbenzodioxane bases provided by this invention are heavy viscous oils or low-melting solids. The acid addition salts of the bases are in general white, crystalline solids. The bases are substantially insoluble in water, whereas the salts, especially those prepared from acids of low molecular weight, have an appreciable water solubility.

The 5-chloro-8-oxy-substituted aminomethylbenzodioxanes and their pharmaceutically acceptable acid addition salts as provided by this invention, are characterized by a physiological activity which makes them suitable for use as hypotensive agents and as tranquilizing agents in mammals. For therapeutic use the compounds preferably are administered in oral medicament form such as compressed tablets, filled capsules, suspensions, and the like, these dosage forms being readily prepared by methods customarily employed in the pharmaceutical art. A suitable dosage amount is from about 0.2 to about 1.0 milligram of therapeutically active compound per kilogram of body weight of treated subject, this dosage to be repeated as necessary in accordance with the individual needs of the subject.

The general method of preparation of the novel compounds of this invention is illustrated below with specific reference to the 8-methoxybenzodioxane compound.

2-chloromethyl-8-methoxybenzodioxane is chlorinated with sulfuryl chloride in anhydrous ether solution to yield a mixture of isomers consisting of the desired 2-chloromethyl-5-chloro-8-methoxybenzodioxane, and 2-chloromethyl - 7 - chloro - 8-methoxybenzodioxane. Although the desired chloro-isomer can be separated, it need not be. Preferably, for ease of separation, the mixture of chloromethyl derivatives is converted by reaction with a primary amine into a product comprising a mixture of the desired 2-substituted-amino-5-chloro-8-methoxybenzodioxane and the therapeutically less effective 7-chloro isomer. The desired 5-chloro isomer can readily be separated from the 7-chloro isomer by taking advantage of the lower solubility of the acid addition salt of the 5-chloro isomer.

Those benzodioxane compounds having 8-substituents other than the methoxy group can be prepared from the 8-methoxy compound by cleaving the methoxyl group with a reagent such as 48 percent hydrobromic acid to yield the corresponding 8-hydroxy compound, and then employing known alkylation procedures to attach the desired substituent to the oxygen of the 8-hydroxy group. Alternatively, they can be obtained by employing the appropriately alkylated 2 - chloromethylbenzodioxane which is obtained from an alkoxycatechol by a condensation process, as set forth below.

This invention is further illustrated by the following specific examples.

EXAMPLE 1

*Preparation of 2-ethylaminomethyl-5-chloro-8-methoxybenzodioxane*

A mixture of 140 g. of 3-methoxycatechol, 300 g. of ethyl-$\alpha,\beta$-dibromopropionate, and 380 g. of potassium carbonate is reacted by the procedure of Koo et al. described in J. Am. Chem. Soc. 77, 5373 (1955). The reaction product which consists of a mixture of 2-carboethoxy-8-methoxybenzodioxane and the corresponding 5-isomer boiling at a temperature of about 130° C. to 140° C. at a pressure of about 0.07 mm. of mercury, is converted by the procedure described by Koo et al. to a mixture of 2-carboxamido-8-methoxybenzodioxane and its corresponding 5-isomer. The 5-isomer is relatively insoluble in the ethanol and precipitates. The alcoholic solution of 2-carboxamido-8-methoxybenzodioxane is separated by filtration, and is evaporated to dryness in vacuo. The filter cake consisting of the 5-isomer is triturated with hot benzene to dissolve any entrapped 8-isomer, and the benzene solution is added while hot to the residue of the 8-isomer remaining after evaporation of the alcohol. The hot benzene solution is filtered, and hexane is added to the point of incipient precipitation whereupon 2-carboxamido-8-methoxybenzodioxane precipitates. It melts at about 148° C. to about 149° C.

A solution of 50 g. of 2-carboxamido-8-methoxybenzodioxane in about 1 l. of ethanol saturated with dry hydrogen chloride is refluxed for about sixteen hours. The reaction mixture is cooled, the ammonium chloride which separates is filtered off, and the filtrate is evaporated in vacuo leaving a residue of 2-carboethoxy-8-methoxybenzodioxane. The residue is dissolved in 500 ml. of ether, and the ether layer is washed sequentially with 200 ml. of water, 200 ml. of 10 percent aqueous sodium hydroxide, and 200 ml. of water. The ether is separated and dried, and the ether is evaporated in vacuo. The residue consisting of 2-carboethoxy-8-methoxybenzodioxane is purified by distillation. It boils at about 130° C. to about 135° C. at a pressure of about 0.05 mm. of mercury.

A solution of 280 g. of 2-carboethoxy-8-methoxybenzodioxane in 1 l. of anhydrous ether is added to 46 g. of lithium aluminum hydride suspended in 2 l. of anhydrous ether. The mixture is stirred for about sixteen hours at ambient room temperature. To the mixture are then added sequentially about 48.5 ml. of water, 36.3 ml. of 20 percent sodium hydroxide solution, and 169 ml. of water. The mixture is filtered to remove inorganic salts, and the filtrate containing 2-hydroxymethyl-8-methoxybenzodioxane is washed with water, is dried, and is evaporated in vacuo. The residue is purified by distillation in vacuo. 2-hydroxymethyl-8-methoxybenzodioxane distills at about 120° C. to about 130° C. at a pressure of about 0.1 mm. of mercury.

200 g. of 2-hydroxymethyl-8-methoxybenzodioxane are dissolved in a mixture of 500 ml. of chloroform and 100 ml. of anhydrous pyridine, and to the solution which is maintained at 10° C. to 15° C., 130 g. of thionyl chloride are added dropwise with stirring. After the addition is complete, the mixture is refluxed for about two hours. It is then cooled and poured over 500 g. of ice. The organic phase containing 2-chloromethyl-8-methoxybenzodioxane is washed sequentially with 100 ml. of 10 percent hydrochloric acid, 100 ml. of water, 100 ml. of 10 percent sodium carbonate solution, and 100 ml. of water. The organic phase is dried, and is evaporated in vacuo. The residue comprising 2-chloromethyl-8-methoxybenzodioxane is purified by distillation in vacuo. It boils at at about 110° C. to about 120° C. at a pressure of about 0.1 mm. of mercury.

To a cold (5° C.) solution of 40 g. of 2-chloromethyl-8-methoxybenzodioxane in 500 ml. of anhydrous ether are added dropwise 27 g. of sulfuryl chloride. The reaction mixture is kept cold for about 2 hours, and is then allowed to warm to room temperature over a period of about twelve hours. The mixture is diluted with an equal volume of ether, and the diluted solution is washed twice with 150 ml. portions of water and three times with 200 ml. portions of saturated potassium bicarbonate solution. The ether layer is dried, and is evaporated in vacuo, leaving a residue comprising a mixture of 2-chloromethyl-5-chloro-8-methoxybenzodioxane and 2-chloromethyl-7-chloro-8-methoxybenzodioxane.

To the mixture of isomers are added 20 g. of ethylamine, and the benzodioxane-amine mixture is heated in a sealed reaction vessel for about six hours at a temperature of about 100° C. The sealed vessel is cooled and opened, and the excess ethylamine is removed from the mixture by evaporation in vacuo. The residue comprising a mixture of 2-ethylaminomethyl-7-chloro-8-methoxybenzodioxane, 2-ethylaminomethyl-5-chloro-8-methoxybenzodioxane and their hydrochloride salts, and ethylamine hydrochloride, is mixed with about 100 ml. of ether. 20 ml. of 10 percent sodium hydroxide are added, yielding an ether solution of 2-ethylaminomethyl-7-chloro-8-methoxybenzodioxane, 2-ethylaminomethyl-5-chloro-8-methoxybenzodioxane and ethylamine. The ether layer containing the benzodioxanes is separated, is washed twice with 50 ml. portions of water, and is dried. The ether and ethylamine are removed by evaporation in vacuo, the residue is dissolved in about 100 ml. of ethanol, and anhydrous hydrogen chloride is bubbled into the solution to convert the mixture of dioxane bases to their corresponding hydrochloride salts. 2-ethylaminomethyl-5-chloro-8-methoxybenzodioxane hydrochloride which is relatively insoluble in the ethanol, precipitates from solution. It is collected by filtration, and is recrystallized twice from ethanol. The purified hydrochloride salt melts at about 242–243° C. *Analysis.*—Calculated: C, 48.99; H, 5.83. Found: C, 49.14; H, 6.00.

3 g. of the purified hydrochloride salt are dissolved in 20 ml. of water, and the solution is made faintly alkaline with 5 percent aqueous sodium hydroxide solution. The 2-ethylaminomethyl-5-chloro-8-methoxybenzodioxane solution which separates is extracted with 25 ml. of ether, the ether solution is dried, and is evaporated in vacuo, leaving the 2-ethylaminomethyl-5-chloro-8-methoxybenzodioxane as a thick oil.

EXAMPLE 2

*Preparation of 2-n-propylaminomethyl-5-chloro-8-methoxybenzodioxane*

A mixture of 2-chloromethyl-5-chloro-8-methoxybenzodioxane and 2-chloromethyl-7-chloro-8-methoxybenzodioxane is converted to a mixture of 2-n-propylaminomethyl-5-chloro-8-methoxybenzodioxane and 2-n-propylaminomethyl-7-chloro-8-methoxybenzodioxane by the procedure of Example 1 except that n-propylamine is employed in place of ethylamine. 2-n-propylaminomethyl-5-chloro-8-methoxybenzodioxane hydrochloride is less soluble in ethanol than is the corresponding 7-chloro isomer, and is separated from that isomer by crystallization from ethanol. The precipitate is purified by trituration with acetone followed by recrystallization from a solvent mixture of ethanol, acetone and ether. 2-n-propylaminomethyl-5-chloro - 8 - methoxybenzodioxane hydrochloride thus prepared melts at about 264–265° C.

2-n-propylaminomethyl-5-chloro - 8 - methoxybenzodioxane is obtained from the hydrochloride salt as a low-melting solid by treating an aqueous solution of the hydrochloride salt with alkali, extracting the free base with ether, and evaporating the ether in vacuo.

EXAMPLE 3

*Preparation of 2-n-butylaminomethyl-5-chloro-8-methoxybenzodioxane*

2-n-butylaminomethyl - 5 - chloro-8-methoxybenzodioxane is prepared by reacting a mixture of 2-chloromethyl-5-chloro-8-methoxybenzodioxane and the 7-chloro isomer with n-butylamine by the procedure described in Example 1. The 2-n-butylaminomethyl-5-chloro-8-methoxybenzodioxane hydrochloride which is obtained is separated from the hydrochloride of the corresponding 7-chloro isomer by recrystallization from ethanol. 2-n-butylaminomethyl - 5 - chloro-8-methoxybenzodioxane hydrochloride is purified by recrystallization from a mixture of ethanol and ethyl acetate. The purified hydrochloride salt melts at about 242–243° C.

5 g. of n-butylaminomethyl-5-chloro-8-methoxybenzodioxane hydrochloride are dissolved in 25 cc. of water and the solution is made alkaline by the addition of 10 percent aqueous sodium hydroxide. The 2-n-butylaminomethyl-5-chloro-8-methoxybenzodioxane which separates is extracted with ether, the ether solution is dried, and is evaporated in vacuo yielding 2-n-butylaminomethyl-5-chloro-8-methoxybenzodioxane as a viscous oil.

EXAMPLE 4

*Preparation of 2-(γ-methoxy-n-propyl)-aminomethyl-5-chloro-8-methoxybenzodioxane*

2-(γ-methoxy-n-propyl)-aminomethyl - 5 - chloro-8-methoxybenzodioxane is prepared by the precedure of Example 1 except that γ-methoxy-n-propylamine is used in place of ethylamine, and the reaction is carried out by refluxing the reaction mixture for 48 hours at atmospheric pressure. 2 - (γ-methoxy-n-propyl) - aminomethyl-5-chloro-8-methoxybenzodioxane hydrochloride is relatively less soluble in ethanol than the 7-chloro isomer and is separated from the 7-chloro isomer by fractional crystallization from ethanol. 2-(γ-methoxy-n-propyl)- aminoethyl-5-chloro-8-methoxybenzodioxane hydrochloride thus prepared melts at about 214–215° C. after recrystallization from an ethanol-ethyl acetate solvent mixture. *Analysis.*—Calculated: C, 49.71; H, 6.26. Found: C, 49.40; H, 6.35.

The free dioxane base was prepared by treating the hydrochloride salt with alkali and extracting the base with ether as described in Example 1.

EXAMPLE 5

*Preparation of 2-n-butylaminomethyl-5-chloro-8-butoxybenzodioxane*

109 g. of 2-n-butylaminomethyl-5-chloro-8-methoxybenzodioxane, as prepared by the method of Example 3, are refluxed for about three hours with 100 ml. of 48 percent hydrobromic acid. The 2-n-butylaminomethyl-5-chloro - 8 - hydroxybenzodioxane hydrobromide which forms is isolated by filtering the chilled reaction mixture. The 2-n-butylaminomethyl-7-chloro-8-hydroxybenzodioxane hydrobromide precipitate is purified by dissolving it in hot ethanol, decolorizing the hot solution with activated carbon, and cooling the deodorized solution. 2-n-butylaminomethyl-5-chloro - 8 - hydroxybenzodioxane hydrobromide thus prepared melts at about 243–244° C. after two more recrystallizations from ethanol.

2-n-butylaminomethyl-5-chloro - 8 - hydroxybenzodioxane hydrobromide is converted to the corresponding free base by dissolving the hydrobromide in water, treating the water solution with an excess of solid sodium bicarbonate and extracting the liberated free base into chloroform. The chloroform extract is dried, and the chloroform is removed by evaporation in vacuo. The residue of 2-n-butylaminomethyl-5-chloro-8-hydroxybenzodioxane is purified by recrystallization from ethanol yielding a product melting at about 142–143° C.

85 g. of 2-n-butylaminomethyl-5-chloro-8-hydroxybenzodioxane are dissolved in about 130 ml. of anhydrous methanol. The solution is cooled to about 5° C. and 122 g. of acetic anhydride are added with stirring over a 75 minute period. After the acetic anhydride has been added, the reaction is allowed to warm to room temperature, and is stirred for about sixteen hours. The mixture is evaporated to dryness in vacuo leaving a residue comprising N-acetyl 2-n-butylaminomethyl-5-chloro-8-hydroxybenzodioxane. The residue is dissolved in about 1 l. of ether and the organic phase is washed twice with 500 ml. portions of 10 percent hydrochloric acid and three times with 500 ml. portions of water. The organic layer is separated, is dried, is evaporated to the point of incipient crystallization, and is cooled. The N-acetyl 2-n-butylaminomethyl-5-chloro - 8 - hydroxybenzodioxane which crystallizes melts at about 83–85° C.

3 g. of N-acetyl 2-n-butylaminomethyl-5-chloro-8-hydroxybenzodioxane are dissolved in about 200 ml. of anhydrous benzene. 0.5 g. of a 50 percent dispersion of sodium hydride in benzene is added, and the mixture is refluxed for about 2½ hours. 1.5 g. of n-butylbromide are added dropwise, and the reaction mixture is refluxed for about 14 hours. The reaction mixture is cooled, the excess sodium hydride is decomposed by the addition of about 5 ml. of ethanol, and the reaction mixture is diluted with about 200 ml. of ether. The solution is washed once with about 200 ml. of water, and is dried. The solution is evaporated in vacuo, the residue of N - acetyl 2-n-butylaminomethyl-5-chloro-8-n-butoxybenzodioxane is dissolved in about 50 ml. of 90 percent ethanol, is saturated with gaseous hydrogen chloride, and is refluxed for about 72 hours. The mixture is evaporated in vacuo, leaving a residue comprising 2-n-butylaminomethyl-5-chloro-8-n - butoxybenzodioxane hydrochloride. To the residue is added a mixture of 200 ml. of ether and sufficient 5 percent sodium bicarbonate solution to liberate the free base which then dissolves in the ether. The ether solution is dried and is saturated with gaseous hydrogen chloride yielding a precipitate of purified 2-n-butylaminomethyl - 5 - chloro-8-n-butoxybenzodioxane hydrochloride. The hydrochloride salt is further purified by triturating it with acetone. The purified salt melts at about 260–261° C. *Analysis.*—Calculated: N, 3.85. Found: N, 3.96.

2-n-butylaminomethyl - 5 - chloro-8-n-butoxybenzodioxane is prepared from its hydrochloride salt by treating an aqueous solution of the salt with alkali and extracting the base with ether, by the procedure described in Example 1.

EXAMPLE 6

*Preparation of 2-n-butylaminomethyl-5-chloro-8-ethoxybenzodioxane*

2 - n - butylaminomethyl - 5 - chloro - 8 - ethoxybenzodioxane is prepared in accordance with the procedure described in Example 1, except that the starting material is 3-ethoxycatechol and the intermediate mixture which is produced containing both 2-chloromethyl-5-chloro-8-ethoxybenzodioxane and the corresponding 7-chloro isomer is reacted with n-butylamine instead of ethylamine. 2-n-butylaminomethyl-5-chloro-8-ethoxybenzodioxane hydrochloride is separated from the hydrochloride of the 7-chloro isomer by taking advantage of its decreased solubility in ethanol. 2-n-butylaminomethyl - 5 - chloro - 8 - ethoxybenzodioxane hydrochloride thus separated is dissolved in water. The water solution is made alkaline and the liberated free base is dissolved in ether. The ether solution is separated, is dried, and the ether is evaporated in vacuo. The residue comprising 2-n-butylaminomethyl-5-chloro-8-ethoxybenzodioxane is distilled and boils at about 150° C. at a pressure of about 0.01 mm. of mercury.

From the benzodioxane base, the hydrochloride salt is prepared by dissolving the base in a minimum amount of ethanol, and neutralizing the base with a stoichiometric equivalent of hydrogen chloride dissolved in ethanol, and evaporating and cooling the alcoholic solution to induce crystallization of 2-n-butylaminomethyl-5-chloro-8-ethoxybenzodioxane hydrochloride. The hydrochloride salt melts at about 222–224° C.

The maleate salt of 2-n-butylaminomethyl-5-chloro-8-ethoxybenzodioxane is prepared by dissolving 0.1 mol of the base in 200 ml. of ether and adding 0.05 mol of maleic acid dissolved in 100 ml. of ether to the solution. The precipitate of the maleate salt of 2-n-butylaminomethyl-5-chloro-8-ethoxybenzodioxane which forms is separated by filtration.

Additional salts of 2-n-butylaminomethyl-5-chloro-8-ethoxybenzodioxane and other substituted aminobenzodioxanes of this invention are prepared in a manner analogous to that set forth above. Additional examples of representative salts include 2-n-allylaminomethyl-5-chloro - 8 - ethoxybenzodioxane phosphate, 2 - n - propylaminomethyl-5-chloro-8-methoxybenzodioxane tartrate, 2-n-butylaminomethyl-5-chloro-8-allyloxybenzodioxane hydrobromide, 2-isoamylaminomethyl-5-chloro-8-methoxybenzodioxane sulfate, and 2-n-butylaminomethyl-5-chloro-8-ethoxybenzodioxane benzoate.

The procedures described in the foregoing examples can be employed to prepare the additional representative compounds of this invention such as are listed below, together with their melting or boiling points.

2 - n - amylaminomethyl - 5 - chloro - 8 - methoxybenzodioxane hydrochloride, M.P. 200–201° C.; 2-sec-amylaminomethyl - 5 - chloro - 8 - ethoxybenzodioxane hydrochloride, M.P. 168–169° C.; 2-($\beta$-methoxypropyl-1)-aminomethyl-5-chloro - 8 - ethoxybenzodioxane hydrochloride, M.P. 223–225° C.; 2-($\beta$-hydroxyethyl)-aminomethyl - 5 - chloro - 8 - ethoxybenzodioxane hydrochloride, M.P. 235–236° C.; 2-isobutylaminomethyl-5-chloro-8-ethoxybenzodioxane hydrochloride, M.P. 236–237° C.; 2 - ethylaminomethyl - 5 - chloro - 8 - ethoxybenzodioxane hydrochloride, M.P. 229–230° C.; 2-allylaminomethyl-5- chloro-8-ethoxybenzodioxane hydrochloride, M.P. 219–220° C.; 2-isopropylaminomethyl-5-chloro-8-ethoxybenzodioxane hydrochloride, M.P. 218–219° C.; 2-n-amylaminomethyl - 7 - chloro - 8 - ethoxybenzodioxane hydrochloride, M.P. 195–197° C.; 2-sec-butylaminomethyl-5-chloro - 8 - ethoxybenzodioxane hydrochloride, M.P. 181–183° C.; 2-n-propylaminomethyl-5-chloro-8-ethoxybenzodioxane hydrochloride, M.P. 242–243° C.; and, 2-isoamylaminomethyl-5-chloro-8-ethoxybenzodioxane hydrochloride, M.P. 218–220° C.

I claim:

1. A compound of the group consisting of 5-chloro-8-oxy - substituted aminomethylbenzodioxanes and their pharmaceutically acceptable acid addition salts, said 5-chloro-8-ethoxyaminomethylbenzodioxanes being represented by the following formula:

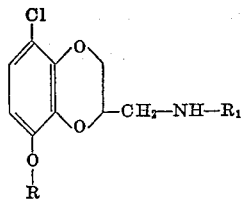

wherein R is an aliphatic hydrocarbon group having from 1 to 3 carbon atoms, and $R_1$ is a member of the group consisting of alkyl, alkenyl, hydroxyalkyl and alkoxyalkyl radicals having from 2 to 6 carbon atoms.

2. A compound represented by the formula:

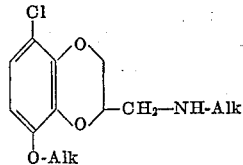

in which Alk is a lower alkyl group.

3. 2 - n - butylaminomethyl - 5 - chloro - 8 - ethoxybenzodioxane.

4. 2 - n - butylaminomethyl - 5 - chloro - 8 - methoxybenzodioxane.

5. 2 - ethylaminomethyl - 5 - chloro - 8 - methoxybenzodioxane.

6. 2 - (γ - methoxy - n - propyl) - aminomethyl - 5 - chloro-8-methoxybenzodioxane.

References Cited in the file of this patent

FOREIGN PATENTS 565,573     Great Britain _____ Nov. 16, 1944

OTHER REFERENCES

Y. de Lestrange: Bull. Soc. Chim., France [5], 2, 1678–84, 1935.

D. Bovet et al.: Medicament du Systeme Nerveux. Vegetatif: S. Karger, S. A. Bale, 1948, p. 271.